United States Patent
Deu-Ngoc et al.

(10) Patent No.: US 8,898,302 B2
(45) Date of Patent: Nov. 25, 2014

(54) METHOD AND SYSTEM FOR PREVENTION OF APPLICATIONS FROM INITIATING DATA CONNECTION ESTABLISHMENT

(75) Inventors: Joseph Tu-Long Deu-Ngoc, Maryhill (CA); Jeremy Thompson, Waterloo (CA)

(73) Assignee: BlackBerry Limited, Waterloo, CA (US)

(*) Notice: Subject to any disclaimer, the term of this patent is extended or adjusted under 35 U.S.C. 154(b) by 258 days.

(21) Appl. No.: 12/956,794

(22) Filed: Nov. 30, 2010

(65) Prior Publication Data

US 2011/0296017 A1 Dec. 1, 2011

Related U.S. Application Data

(60) Provisional application No. 61/349,968, filed on May 31, 2010.

(51) Int. Cl.
| | | |
|---|---|---|
| *G06F 15/173* | (2006.01) | |
| *H04L 29/08* | (2006.01) | |
| *H04L 29/14* | (2006.01) | |
| *H04W 76/02* | (2009.01) | |
| *H04W 80/04* | (2009.01) | |

(52) U.S. Cl.
CPC ........... *H04W 76/027* (2013.01); *H04L 67/141* (2013.01); *H04L 69/40* (2013.01); *H04W 76/022* (2013.01); *H04W 80/04* (2013.01); *H04L 67/04* (2013.01)
USPC ............................ 709/225; 709/223; 709/224

(58) Field of Classification Search
USPC ........................................................ 709/225
See application file for complete search history.

(56) References Cited

U.S. PATENT DOCUMENTS

| 7,076,239 | B2 * | 7/2006 | Kirkup et al. ................ 455/411 |
|---|---|---|---|
| 2008/0160958 | A1 | 7/2008 | Abichandani et al. |
| 2009/0041014 | A1 * | 2/2009 | Dixon et al. ................... 370/392 |
| 2009/0135749 | A1 * | 5/2009 | Yang ............................. 370/310 |
| 2010/0323663 | A1 * | 12/2010 | Vikberg et al. ............... 455/410 |
| 2011/0230178 | A1 * | 9/2011 | Jones et al. ................ 455/422.1 |
| 2012/0033554 | A1 * | 2/2012 | Shiva et al. ................... 370/235 |

FOREIGN PATENT DOCUMENTS

| EP | 1655901 A1 | 5/2006 |
|---|---|---|
| WO | 2009135290 A1 | 11/2009 |

OTHER PUBLICATIONS

EP Application No. 10193106.1, Extended European Search Report dated Mar. 25, 2011.

* cited by examiner

*Primary Examiner* — Umar Cheema
(74) *Attorney, Agent, or Firm* — Moffat & Co.

(57) ABSTRACT

A method and apparatus for prevention of user-level applications from initiating data connection establishment using signaling from radio code, the method including receiving a request from an application on a mobile device at a tunnel management module on the mobile device, the request being to establish a data connection with a network; checking a state of a tunnel for the data connection at the tunnel management module; blocking the connection request if the tunnel for the data connection is in a stalled state; and allowing the connection request to proceed to a networking access interface module if the tunnel for the data connection is not in a stalled state.

22 Claims, 4 Drawing Sheets

METHOD AND SYSTEM FOR PREVENTION OF APPLICATIONS FROM INITIATING DATA CONNECTION ESTABLISHMENT

RELATED APPLICATIONS

The present disclosure claims priority from U.S. provisional application No. 61/349,968 filed May 31, 2010, the entire contents of which are incorporated herein by reference.

FIELD OF DISCLOSURE

The present disclosure relates to radio bearers for mobile device and in particular to the establishment of radio bearers.

BACKGROUND

A mobile device requires the establishment of a radio access bearer in order to communicate with the wireless network infrastructure. Furthermore, some devices allow the establishment of multiple radio access bearers for communication. In one instance, multiple radio access bearers can be dependent on the device requiring multiple (PDP) contexts. Thus, for example, a device may have a propriety PDP context for the manufacturer of the device, a general wireless application protocol (WAP) context for browsing, a multimedia messaging service (MMS) PDP context for MMS applications, a streaming media PDP context for streaming media applications, among others. As will be appreciated, a PDP context is a term that is generally referred to in the third generation partnership project (3GPP) and more generally, the term "tunnel" is used herein to refer to a data connection to a particular network.

The establishment of a connection may fail for a variety of reasons. For example, the network may indicate that a particular data connection is not allowed in the current network area. However, user-level applications may not know how to interpret this information and have little knowledge of when a data connection can or cannot be established. An application or client may thus initiate a data connection process continually, even on data connections which are known to fail.

BRIEF DESCRIPTION OF THE DRAWINGS

The present disclosure will be better understood with reference to the drawings in which.

DETAILED DESCRIPTION

The present disclosure provides a method comprising: receiving a request from an application on a mobile device at a tunnel management module on the mobile device, the request being to establish a data connection with a network; checking a state of a tunnel for the data connection at the tunnel management module; blocking the connection request if the tunnel for the data connection is in a stalled state; and allowing the connection request to proceed to a networking access interface module if the tunnel for the data connection is not in a stalled state.

The present disclosure further provides a mobile device comprising: a processor; a communications subsystem; and memory storing an application; a tunnel management module; and a networking access interface module, wherein the processor and communications subsystem cooperate to: receive a request from the application at the tunnel management module, the request being to establish a data connection with a network; check a state of a tunnel for the data connection at the tunnel management module; block the connection request if the tunnel for the data connection is in a stalled state; and allow the connection request to proceed to the networking access interface module if the tunnel for the data connection is not in a stalled state.

As indicated above, user-level applications have little or no knowledge of when a data connection can or cannot be established. This may make the data connection process inefficient as the user-level application may continually try to establish data connections which are known to fail. For example, a network may indicate that a particular data connection is not allowed in the current network area. However the user-level application may not know how to interpret the information.

The present disclosure provides for a registry of data connections which associate particular connection states to each data connection registered. Further, radio code associated with a particular radio communication method may interpret radio access technology specific causes received over a radio network, and may signal to the registry a state for the radio connection.

For example, a general packet radio service (GPRS) radio code would know better than a user application how to interpret a GPRS-cause given by a network. Thus, a received cause stating that a data connection is not allowed in the current area may be interpreted by the radio code and signaling generated to send to the registry indicating that the state for the connection is "stalled".

Figure 1:
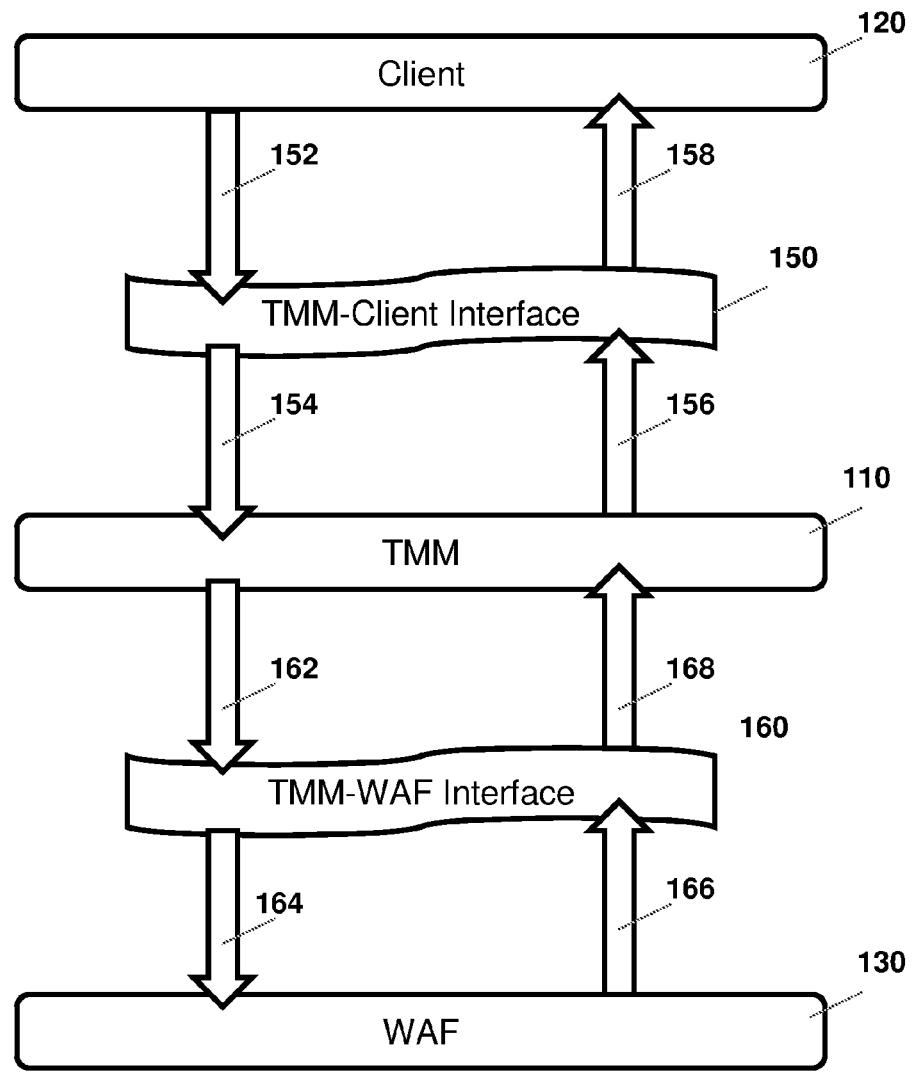
FIG. 1 is a block diagram showing a tunnel management module interface.

Reference is now made to FIG. 1. FIG. 1 shows an exemplary block diagram of various components within a mobile device that may be used to establish connections from the mobile device to a network. In particular, a tunnel management module (TMM) 110 is an intermediate module between a client 120 and a wireless access family (WAF) 130.

Client 120 may be any service or application that requires a data connection with a network. Examples of clients 120 include, but are not limited to, email applications, web browsers, multimedia services, streaming media, among others.

Wireless access family (WAF) 130 provides for the various wireless access options on the mobile device. Thus, if a mobile device is able to connect over both code division multiple access (CDMA) and third generation partnership project (3GPP) technologies such as global system for mobile communication (GSM), universal mobile telecommunications system (UMTS), long term evolution (LTE), or long term evolution advanced (LTE-A) then the wireless access family may have a WAF-CDMA and a WAF-3GPP option. In other embodiments, the WAF 130 may have access to wireless local area networks (WLANs) over technologies such as WiFi™ or WiMAX™. Further, the present disclosure is not meant to be limited to any particular wireless access family and those skilled in the art will appreciate that WAF 130 may be customized for each particular mobile device. WAF 130 is also referred to as a networking access interface. Further, the networking access interface does not need to be wireless in some embodiments.

TMM 110 provides a registry of data connections for clients 120. The tunnels for the data connection are each provided with a state, as described in more detail below.

Requests to establish a data connection proceed from client 120 to TMM 110. TMM 110 then proceeds to forward the request to WAF 130 in certain situations, as described in more detail below.

In order to access the registry of data connections at TMM 110, an interface 150 is provided between the client 120 and TMM 110. Client to TMM functions may be provided using TMM-Client interface 150, as shown by arrow 152. Further, TMM-Client interface 150 may provide client to TMM messaging, as shown by arrow 154.

TMM-to-client functions may be provided, as shown by arrow 156, between TMM 110 and TMM-Client interface 150. Also, TMM-Client interface 150 may provided TMM-to-client messaging, as shown by arrow 158.

Similarly, an interface between TMM 110 and WAF 130 is provided, as shown by TMM-WAF interface 160. TMM-to-WAF functions may be provided to TMM-WAF interface 160, as shown by arrow 162. The TMM-WAF interface 160 may then provide TMM-to-WAF messaging, as shown by arrow 164.

WAF-to-TMM functions may be provided to the TMM-WAF interface 160, as shown by arrow 166. Further, TMM-WAF interface 160 may provide WAF-to-TMM messaging, as shown by arrow 168.

The use of the TMM-client interface 150 allows various clients to communicate with TMM 110. Further, the use of TMM-WAF interface 160 allows for various WAF 130 to be able to communicate with TMM 110.

As indicated above, TMM 110 maintains registry with a state for each tunnel registered with TMM 110.

References in the remaining figures may include reference numerals from FIG. 1.

Figure 2:
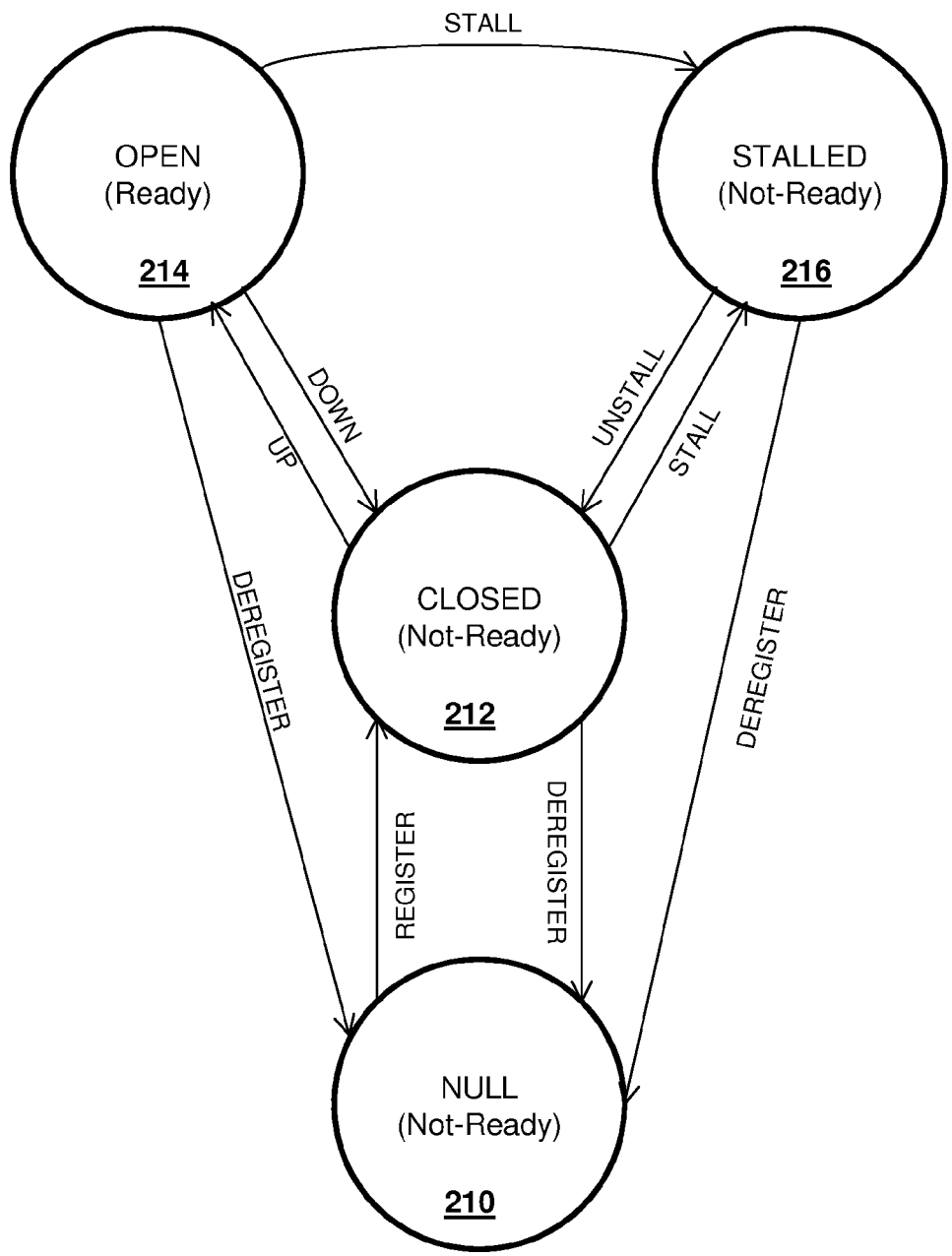
FIG. 2 is a state diagram showing various tunnel states.

Reference is now made to FIG. 2, which shows an exemplary state machine in which four internal states are defined. Namely, the internal states may be null state 210, closed state 212, open state 214, and stalled state 216. Each is described in more detail below.

Further, the internal states shown by state machine of FIG. 2 can be mapped to external states. The external states may be ready or not-ready. A ready external state means that the tunnel could be used to send and receive data. A not-ready state means that the tunnel cannot be used to send or receive data at the moment. The description below discusses internal states and may provide a link to an external state.

Initially, before a tunnel is registered with TMM 110, a tunnel may be in a null state 210. This indicates that the tunnel record is not allocated. Messages regarding activation and deactivation are flushed for a tunnel is null state 210.

Further, tunnels in null state 210 cannot be considered for activation by TMM 110. The null state 210 may be considered to be not-ready from an external state perspective.

During tunnel allocation in null state 210, tunnels may be considered but only if clear. A clear pending flag is used for this purpose. In other words, if there are pending messages for the tunnels, the clear pending flag ensures that newly allocated tunnels do not receive stale activation or deactivation messages from the WAF when reallocated.

From null state 210 a tunnel may be registered. Registration moves the state of the tunnel from null state 210 to closed state 212.

Closed state 212 indicates that the tunnel record is allocated, but the tunnel is not activated. Tunnels in this state are considered for activation by TMM 110. As will be appreciated, one purpose of TMM 110 is to provide service to a maximal set of registered tunnels, and thus, closed state 212 is, in effect, a continual retry state. Further, the closed state 212 maps to the not ready external state.

From closed state 212 the tunnel may be activated by TMM 110, in which case the state proceeds to open state 214. Further, the tunnel may be deregistered, which would cause the state to move back to null state 210. Finally, the tunnel may be considered to be stalled, in which case the state would change to stalled state 216.

Open state 214 indicates that the tunnel record is allocated and the tunnel is activated. Tunnels in this state are used for communication of data. Open state 214 maps to a ready external state.

The state may change from open state 214 if the tunnel is deactivated, in which case the state changes to closed state 212. This may, for example, be required if a prioritization algorithm changes the priority of the tunnels and the current tunnel does not have a high enough priority.

For example, a network may have a "watermark" which indicates how many tunnels are allowed to be open. If two tunnels are allowed to be open and two other services have a higher priority than the current tunnel, the prioritization algorithm may find that the present tunnel needs to be deactivated which would move the tunnel to closed state 212.

In other cases, the tunnel may be finished with the exchange of data, and may be deactivated, causing the state of the tunnel to change to closed state 212.

From open state 214, the tunnel may further be deregistered, which would change the state to null state 210.

Also, from state 214, the tunnel may be stalled, which would move the state to stalled state 216.

Stalled state 216 indicates that the tunnel record is allocated, but the tunnel is not activated. Messages regarding activation and deactivation are flushed for a tunnel in stalled state 216.

One difference between stalled state 216 and closed state 212 is that tunnels that are in stalled state 216 are not considered for activation by TMM 110. Entering stalled state 216 effectively halts retries and the state is considered externally as not-ready.

From stalled state 216 the tunnel may be deregistered, causing the state to change to null state 210. The tunnel may also be unstalled, and change the state to closed state 212.

Based on FIG. 2, the TMM keeps a state for each registered tunnel which may be one of the closed, open or stalled states shown. Tunnels that are not registered with TMM 110 are considered to be in a null state 210. However, as will be appreciated, since the tunnel in null state 210 is not registered with the TMM 110, no entry in the registry will exist for the tunnel in one embodiment.

A client 120 uses a tunnel to obtain data from a network. To use the tunnel, the tunnel must change to an open state by being activated through a tunnel establishment attempt. The result of the establishment attempt is that the tunnel may be successfully established or that the establishment may fail.

In the case of failure, as indicated above, WAF 130 is in a better position to interpret radio codes than client 120. Having client 120 interpret radio codes may cause the client 120 to misinterpret the radio code or ignore the radio code. Therefore, if the radio code indicates that a data connection cannot be established at this time, the client may ignore the radio code or not be capable of interpreting the radio code, and continue to try to establish a data connection. This uses unnecessary network resources since connection requests are continually being made. Further, the continual attempt to establish a connection can drain battery resources on the mobile device.

Figure 3:
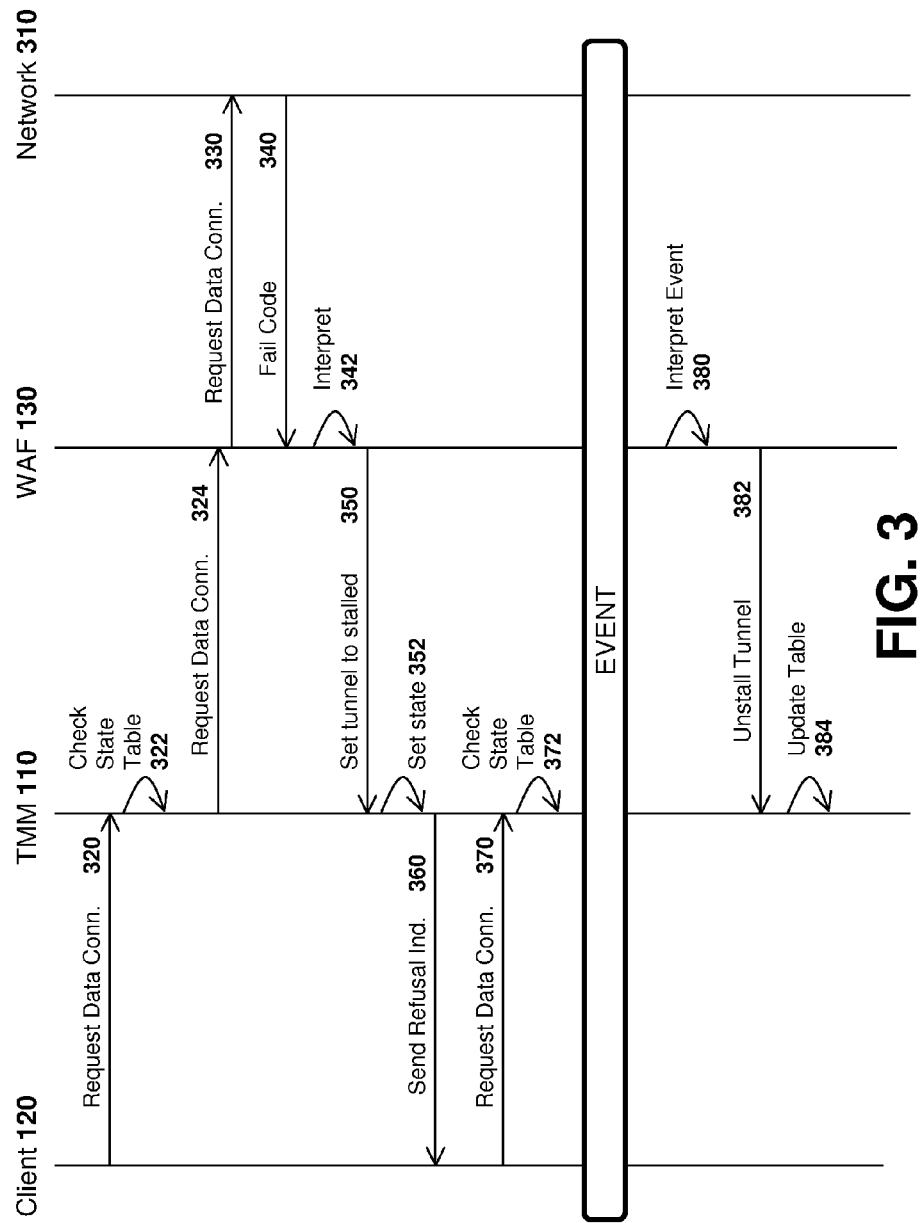
FIG. 3 is a data flow diagram showing a data connection establishment attempt.

Reference is now made to FIG. 3. FIG. 3 shows a data flow diagram between a client 120, TMM 110, WAF 130 and a network 310.

Client 110, in FIG. 3 may for example be a browser application. The browser application may be brought up by a user of a mobile device and an attempt to connect to the internet may be made over a WAP tunnel. In the example of FIG. 3, it is assumed that the WAP tunnel is previously registered with TMM 110 and that tunnel has therefore been placed in a closed state by TMM 110.

Client 120 requests a data connection over a WAP tunnel be established as shown by message 320. TMM 110 checks the state of the tunnel for the service of client 120, as shown by arrow 322 and determines that the tunnel is currently in a closed state. Based on this, the TMM 110 sends a message to WAF 130 requesting a data connection, as shown by arrow 324. WAF 130 then requests a data connection with network 310, as shown by arrow 330.

Network 310 may determine that the data connection is now allowed for the current public land mobile network (PLMN) based on agreements between the mobile device carrier and the current network, for example. Therefore, a fail message 340 is returned to WAF 130, indicating a cause code of "roaming not allowed in PLMN".

In accordance with one embodiment of the present disclosure, WAF 130 then interprets the fail code received in message 340, as shown by arrow 342 and determines that the tunnel should be set to a stalled state 216. The WAF 130 then sends a message 350 to TMM 110 indicating that the tunnel should be set to stalled state 216. TMM 110 receives message 350 and updates the state of the tunnel, as shown by arrow 352.

TMM 110 may then optionally send a refusal indication to client 120, as shown by arrow 360.

Subsequently, client 120 may decide that it wants to again attempt to establish a data connection. A message 370 may be sent to TMM 110. In this case, TMM 110 checks the state of the tunnel and determines that the tunnel is in a stalled state, as shown by arrow 372. TMM 110 therefore does not consider activation of the tunnel and no further messaging is sent to WAF 130 or to network 310, thereby saving battery resources on the mobile device, as well as network resources.

At some later time, an event may occur. For example, the routing area or the location area of the network may change. In this case, WAF 130 interprets the event, as shown by arrow 380, and determines that the routing area has changed. In this case, the interpretation at arrow 380 decides that the tunnels may be unstalled and thus an unstall message 382 is sent to TMM 110 which may be then update the state of the tunnel, as shown by arrow 384.

The example of FIG. 3 utilizes a "roaming is not allowed in the PLMN" fail code at arrow 340. However, other indications that a data connection cannot be established would be known to those in the art. Examples, which are not limiting, include a set of Session Management errors (for the 3GPP WAF), including:

```
SM_CAUSE_OPERATOR_DETERMINED                        = 0x08,
SM_CAUSE_MISSING_OR_UNKNOWN_APN                     = 0x1B,
SM_CAUSE_UNKNOWN_PDP_ADDRESS_OR_PDP_TYPE            = 0x1C,
SM_CAUSE_USER_AUTHENTICATION_FAILED                 = 0x1D,
SM_CAUSE_REJECTED_BY_GGSN                           = 0x1E,
SM_CAUSE_SERVICE_OPTION_NOT_SUPPORTED               = 0x20,
SM_CAUSE_REQUESTED_SERVICE_OPTION_NOT_SUBSCRIBED    = 0x21,
SM_CAUSE_QOS_NOT_ACCEPTED                           = 0x25,
SM_CAUSE_FEATURE_NOT_SUPPORTED                      = 0x28,
SM_CAUSE_SEMANTIC_ERROR_IN_TFT_OPERATION            = 0x29,
SM_CAUSE_SYNTACTICAL_ERROR_IN_TFT_OPERATION         = 0x2A,
SM_CAUSE_SEMANTIC_ERROR_IN_PACKET_FILTERS           = 0x2C,
SM_CAUSE_SYNTACTICAL_ERROR_IN_PACKET_FILTERS        = 0x2D,
SM_CAUSE_PDP_CONTEXT_WITHOUT_TFT_ALREADY_ACTIVATED  = 0x2E,
SM_CAUSE_PDP_TYPE_IPV4_ONLY_ALLOWED                 = 0x32,
SM_CAUSE_PDP_TYPE_IPV6_ONLY_ALLOWED                 = 0x33,
SM_CAUSE_SINGLE_ADDRESS_BEARERS_ONLY_ALLOWED        = 0x34,
SM_CAUSE_SEMANTICALLY_INCORRECT_MESSAGE             = 0x5f,
SM_CAUSE_INVALID_MANDATORY_INFORMATION              = 0x60,
SM_CAUSE_INVALID_MESSAGE_TYPE                       = 0x61,
SM_CAUSE_BAD_MESSAGE_TYPE_FOR_STATE                 = 0x62,
SM_CAUSE_INVALID_INFORMATION_ELEMENT                = 0x63,
SM_CAUSE_CONDITIONAL_IE_ERROR                       = 0x64,
SM_CAUSE_BAD_MESSAGE_FOR_STATE                      = 0x65,
SM_CAUSE_BAD_APN_RESTRICTION_VALUE_FOR_ACTIVE_PDP   = 0x70,
```

The above therefore provides for the maintaining of a state registry at a TMM to prevent user level applications such as client 120 from initiating a data connection establishment attempt in the case that an indication from radio code has been previously received indicating that the data connection cannot be established for the current network.

The tunnel management module 110 may be a software module located on a mobile device and in particular located in memory on the device. Further, client 120 may be any user-level application or other application on the device, stored in the memory on the device or accessible by the device, and using a processor of the device for running the application.

WAF 130 may be comprised of both the communications subsystem and software associated with it to use various communication technologies supported by the mobile device and to interpret radio level cause codes received by the device from a network that the device connects to.

Figure 4:
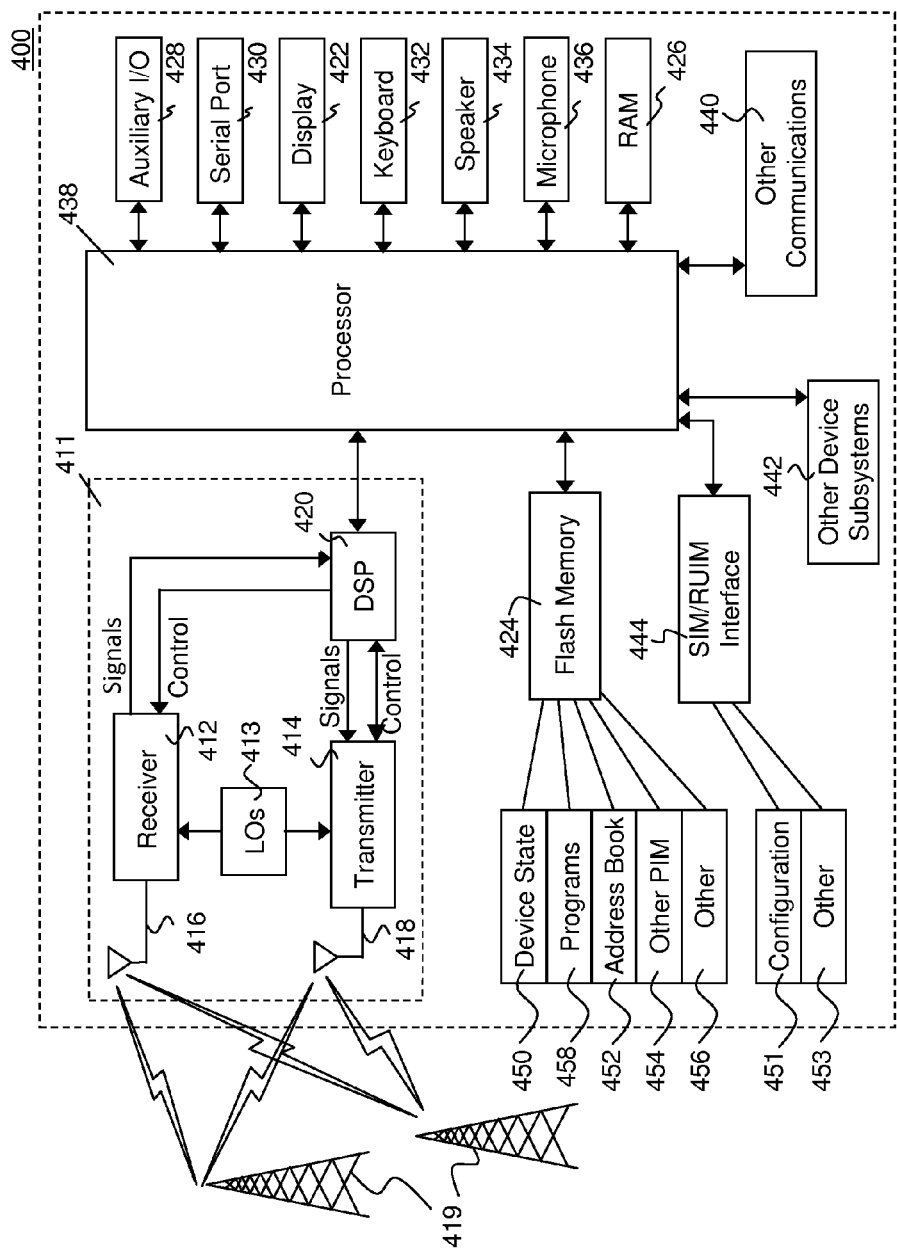
FIG. 4 is block diagram showing an exemplary mobile device.

As will be appreciated, the registering of tunnels with a tunnel registry, maintaining states for tunnels at the tunnel registry, and deciding whether to initiate a data connection establishment request may be done utilizing the processor on a mobile device, in combination with a communications subsystem of the mobile device. One such exemplary mobile device is illustrated below with reference to FIG. 4. The mobile device of FIG. 4 is however not meant to be limiting and other mobile devices could also be used.

Mobile device 400 is typically a two-way wireless communication device having voice and data communication capabilities. Mobile device 400 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 400 is enabled for two-way communication, it will incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate.

Network access requirements will also vary depending upon the type of network 419. In some networks network access is associated with a subscriber or user of mobile device 400. A mobile device may require a removable user identity module (RUIM) or a subscriber identity module (SIM) card in order to operate on a network. The SIM/RUIM interface 444 is normally similar to a card-slot into which a SIM/RUIM card can be inserted and ejected like a diskette or PCMCIA card. The SIM/RUIM card can have memory and hold many key configuration 451, and other information 453 such as identification, and subscriber related information.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1×EVDO system, a CDMA base station and an EVDO base station communicate with the mobile station and the mobile device is connected to both simultaneously. The EVDO and CDMA 1× base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Processor 438, in addition to its operating system functions, may enable execution of software applications on the mobile device. A predetermined set of applications that control basic operations, including at least data and voice communication applications for example, will normally be installed on mobile device 400 during manufacturing. Other applications could be installed subsequently or dynamically.

Applications and software, such as client 120, TMM 110, WAF 130, among others, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 419. In one embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the processor 438, which may further process the received signal for output to the display 422, or alternatively to an auxiliary I/O device 428.

A user of mobile device 400 may also compose data items such as email messages for example, using the keyboard 432, which may be a complete alphanumeric keyboard or telephone-type keypad, among others, in conjunction with the display 422 and possibly an auxiliary I/O device 428. Such composed items may then be transmitted over a communication network through the communication subsystem 411.

For voice communications, overall operation of mobile device 400 is similar, except that received signals would typically be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

While the above examples utilize PDP contexts in 3GPP networks such as HSDPA networks, the solution is equally applicable to other networks, which include but are not limited to Universal Mobile Telecommunications System (UMTS) networks, Global System for Mobile telephony (GSM) networks, Long Term Evolution (LTE) networks, among others. For example, in UMTS, the channels are cumulative and the data must therefore be shared between the channels.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method comprising:
receiving a request from an application on a mobile device at a tunnel management module on the mobile device, the request being to establish a data connection with a network;

determining if a state of a tunnel for the data connection at the tunnel management module is a stalled state, the state being a connection state and the stalled state indicating a tunnel record is allocated for the tunnel and the tunnel is not activated;

blocking the connection request from proceeding to a networking access interface module of the device for transmission to the network if the tunnel for the data connection is in the stalled state;

allowing the connection request to proceed to the networking access interface module of the device for transmission to the network if the tunnel for the data connection is not in the stalled state; and if the connection request is allowed to proceed to the networking access interface module for transmission to the network:
receiving information from the network responsive to the connection request from the mobile device; and
if the received information indicates that the connection request was rejected by the network, setting the state of the tunnel at the tunnel management module to the stalled state.

2. The method of claim 1, wherein the tunnel is registered with the tunnel management module prior to the application requesting the data connection.

3. The method of claim 1, wherein the tunnel management module stores a state for a plurality of tunnels registered with the tunnel management module.

4. The method of claim 1, wherein the tunnel management module receives, from the networking access interface module, a state for the tunnel.

5. The method of claim 4, wherein the state corresponds with a rejected connection attempt between the networking access interface module and a network element.

6. The method of claim 5, wherein the rejected connection attempt is based on receipt of a Roaming Not Allowed in Public Land Mobile Network message from the network element.

7. The method of claim 5, wherein the state corresponds with the mobile device moving into a new routing area.

8. The method of claim 1, wherein the application is a user level application selected from the group consisting of a browser application, an email application, a multimedia service application, and a data streaming application.

9. The method of claim 1, wherein the tunnel is a packet data protocol context.

10. The method of claim 1, wherein the tunnel is one of a device proprietary tunnel, a wireless access protocol tunnel, a multimedia messaging service tunnel, and a streaming media tunnel.

11. A mobile device comprising:
a processor;
a communications subsystem; and
memory, said memory storing:
an application;
a tunnel management module; and
a networking access interface module,
wherein the processor and communications subsystem cooperate to:
receive a request from the application at the tunnel management module, the request being to establish a data connection with a network;
determine if a state of a tunnel for the data connection at the tunnel management module is a stalled state, the state being a connection state and the stalled state indicating a tunnel record is allocated for the tunnel and the tunnel is not activated;

block the connection request from proceeding to the networking access interface module for transmission to the network if the tunnel for the data connection is in the stalled state;

allow the connection request to proceed to the networking access interface module for transmission to the network if the tunnel for the data connection is not in the stalled state; and if the connection request is allowed to proceed to the networking access interface module for transmission to the network:

receive information from the network responsive to the connection request from the mobile device; and if the received information indicates that the connection request was rejected by the network, set the state of the tunnel at the tunnel management module to the stalled state.

12. The mobile device of claim 11, wherein the tunnel is registered with the tunnel management module prior to the application requesting the data connection.

13. The mobile device of claim 11, wherein the tunnel management module stores a state for a plurality of tunnels registered with the tunnel management module.

14. The mobile device of claim 11, wherein the tunnel management module receives, from the networking access interface module, a state for the tunnel.

15. The mobile device of claim 14, wherein the state corresponds with a rejected connection attempt between the networking access interface module and a network element.

16. The mobile device of claim 15, wherein the rejected connection attempt is based on receipt of a Roaming Not Allowed in Public Land Mobile Network message from the network element.

17. The mobile device of claim 15, wherein the state corresponds with the mobile device moving into a new routing area.

18. The mobile device of claim 11, wherein the application is a user level application selected from the group consisting of a browser application, an email application, a multimedia service application, and a data streaming application.

19. The mobile device of claim 11, wherein the tunnel is a packet data protocol context.

20. The mobile device of claim 11, wherein the tunnel is one of a device proprietary tunnel, a wireless access protocol tunnel, a multimedia messaging service tunnel, and a streaming media tunnel.

21. The method of claim 5 further comprising, after the receiving, setting the state of the tunnel at the tunnel management module to the stalled state.

22. The mobile device of claim 15, wherein the processor is configured to, after the receiving of the rejected connection attempt, set the state of the tunnel at the tunnel management module to the stalled state.

* * * * *